(12) United States Patent
Johnson et al.

(10) Patent No.: US 10,500,784 B2
(45) Date of Patent: *Dec. 10, 2019

(54) ADDITIVE DEPOSITION SYSTEM AND METHOD

(71) Applicant: Palo Alto Research Incorporated, Palo Alto, CA (US)

(72) Inventors: David Mathew Johnson, San Francisco, CA (US); Victor Alfred Beck, Menlo Park, CA (US); Scott A. Elrod, La Honda, CA (US); David K. Biegelsen, Portola Valley, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 442 days.

This patent is subject to a terminal disclaimer.

(21) Appl. No.: 15/001,408

(22) Filed: Jan. 20, 2016

(65) Prior Publication Data

US 2017/0203504 A1 Jul. 20, 2017

(51) Int. Cl.
*B29C 67/00* (2017.01)
*B29C 64/106* (2017.01)
*B33Y 30/00* (2015.01)

(52) U.S. Cl.
CPC ............. *B29C 64/106* (2017.08); *B33Y 30/00* (2014.12)

(58) Field of Classification Search
CPC ..... B29C 64/106; B29C 64/112; B29C 64/20; B29C 64/209; B29C 64/214;

(Continued)

(56) References Cited

U.S. PATENT DOCUMENTS

| 2,291,046 | A |   | 7/1942 | Lange |
| 2,551,582 | A | * | 5/1951 | Carlson ................. G03G 15/22 |
|   |   |   |   | 101/472 |

(Continued)

FOREIGN PATENT DOCUMENTS

| EP | 2868390 | 4/1988 |
| EP | 2227834 | 8/2011 |

(Continued)

OTHER PUBLICATIONS

Extended European Search Report, EP17151186.8, dated Jun. 14, 2017.

(Continued)

*Primary Examiner* — Xiao S Zhao
*Assistant Examiner* — Ninh Le
(74) *Attorney, Agent, or Firm* — Miller Nash Graham and Dunn

(57) ABSTRACT

An additive deposition system and method, the system including generating an aerosol of additive material that is charged and deposited onto a selectively charged substrate. Selectively charging the substrate includes uniformly charging a surface of the substrate, selectively removing charged from the substrate to create charged and neutral regions of the substrate surface. The charged regions of the substrate having a polarity opposite a polarity of the charged aerosol. The charged aerosol of additive material deposited onto the selectively charged portions of the substrate surface due to the potential difference between the charged substrate and charged aerosol. The system and method further including repeating the additive deposition process to create a multi-layer matrix of additive material.

19 Claims, 4 Drawing Sheets

(58) Field of Classification Search
CPC ..... B29C 64/218; B29C 64/357; B29C 64/30; B05B 5/002; B05B 5/0255; B05B 5/1608; B05B 5/00; B05B 5/04; B05B 3/02; B33Y 30/00; B05D 1/04; B01J 13/0095; B01F 3/04028; B01F 3/04042
See application file for complete search history.

(56) References Cited

U.S. PATENT DOCUMENTS

| | | | |
|---|---|---|---|
| 3,052,213 | A | 9/1962 | Schaffert |
| 3,068,115 | A | 12/1962 | Gundlach |
| 3,330,683 | A | 7/1967 | Simm et al. |
| 3,554,815 | A | 1/1971 | Otto |
| 3,626,833 | A | 12/1971 | Koch |
| 3,649,829 | A | 3/1972 | Randolph |
| 3,702,258 | A | 11/1972 | Gibbons et al. |
| 3,717,875 | A | 2/1973 | Arciprete et al. |
| 3,779,166 | A | 12/1973 | Pressman et al. |
| 3,797,926 | A | 3/1974 | Fotland et al. |
| 3,873,025 | A * | 3/1975 | Qvarnstrom ..... B05B 3/02 118/300 |
| 3,926,114 | A | 12/1975 | Matuschke |
| 3,977,323 | A | 8/1976 | Pressman et al. |
| 4,034,670 | A | 7/1977 | Zavodny |
| 4,217,062 | A | 8/1980 | Trp et al. |
| 4,222,059 | A | 9/1980 | Crean et al. |
| 4,384,296 | A | 5/1983 | Torpey |
| 4,860,652 | A | 8/1989 | Kawata |
| 4,993,320 | A | 2/1991 | Kochsmeier |
| 5,103,763 | A * | 4/1992 | Goldowsky ..... G02F 1/133516 118/624 |
| 5,123,350 | A | 6/1992 | Fadner |
| 5,127,325 | A | 7/1992 | Fadner |
| 5,191,703 | A | 3/1993 | John |
| 5,204,697 | A | 4/1993 | Schmidlin |
| 5,207,158 | A | 5/1993 | Fadner et al. |
| 5,270,086 | A | 12/1993 | Hamlin |
| 5,314,119 | A * | 5/1994 | Watt ..... B05B 3/08 101/363 |
| 5,609,919 | A | 3/1997 | Yuan et al. |
| 6,382,524 | B1 | 5/2002 | James |
| 6,399,143 | B1 * | 6/2002 | Sun ..... A61K 9/2072 427/2.14 |
| 6,576,861 | B2 | 6/2003 | Sampath et al. |
| 6,622,335 | B1 | 9/2003 | Anderson et al. |
| 6,934,142 | B2 | 8/2005 | Grosse et al. |
| 7,083,830 | B2 | 8/2006 | Minko |
| 8,132,744 | B2 | 3/2012 | King et al. |
| 8,272,579 | B2 | 9/2012 | King et al. |
| 8,511,251 | B2 | 8/2013 | Sato |
| 8,552,299 | B2 | 10/2013 | Rogers et al. |
| 8,720,370 | B2 | 5/2014 | Rebstock |
| 8,742,246 | B2 | 6/2014 | Toyoda et al. |
| 9,021,948 | B2 | 5/2015 | Pattekar |
| 2002/0053320 | A1 | 5/2002 | Duthaler et al. |
| 2004/0050701 | A1 | 3/2004 | McEntee et al. |
| 2005/0000231 | A1 | 1/2005 | Lee |
| 2006/0035033 | A1 | 2/2006 | Tanahashi et al. |
| 2007/0194157 | A1 * | 8/2007 | Golden ..... B05B 5/025 239/698 |
| 2009/0014046 | A1 | 1/2009 | Yu et al. |
| 2009/0155732 | A1 | 6/2009 | Limb |
| 2010/0017346 | A1 * | 1/2010 | Extrand ..... C23C 16/26 705/400 |
| 2010/0154856 | A1 | 6/2010 | Yuichi et al. |
| 2010/0221449 | A1 * | 9/2010 | Schlatterbeck ..... B05C 11/06 427/558 |
| 2011/0017431 | A1 | 1/2011 | Yang et al. |
| 2011/0031100 | A1 | 2/2011 | Qtaishat et al. |
| 2011/0150036 | A1 | 6/2011 | Lee et al. |
| 2011/0154558 | A1 | 6/2011 | Peter et al. |
| 2012/0227778 | A1 | 9/2012 | Leonov |
| 2013/0087180 | A1 | 4/2013 | Stark et al. |
| 2014/0146116 | A1 | 5/2014 | Paschkewitz |
| 2015/0062250 | A1 * | 3/2015 | Byun ..... B05B 5/00 347/55 |
| 2015/0075425 | A1 * | 3/2015 | Byun ..... B05B 5/03 118/708 |
| 2015/0190824 | A1 | 7/2015 | Nardi et al. |
| 2015/0197063 | A1 | 7/2015 | Shinar et al. |
| 2016/0229119 | A1 | 8/2016 | Renn |
| 2016/0326386 | A1 | 11/2016 | Toyserkani et al. |

FOREIGN PATENT DOCUMENTS

| | | |
|---|---|---|
| FR | 1035235 | 8/1953 |
| WO | 93/13897 | 7/1993 |
| WO | 97/09125 | 3/1997 |
| WO | 2004028707 | 4/2004 |
| WO | 2006122645 | 11/2006 |
| WO | WO2015183644 | 12/2015 |

OTHER PUBLICATIONS

Extended European Search Report, EP17151227.0, dated Jun. 27, 2017.

Extended European Search Report, EP17151223.9, dated Jun. 12, 2017.

Sholin, V. et al.: "High Work Function Materials for Source/Drain Contacts in Printed Polymer Thin Transistors," Applied Physics Letters, vol. 92, 2008.

Zhou, Li, et al: "Highly Conductive, Flexible, Polyurethane-Based Adhesives for Flexible and Printed Electronics," Advanced Functional Materials, vol. 23, p. 1459-1465, wileyonlinelibrary.com.

McClure, Max, "Stanford Researchers' Cooling Glove Better than Steroids—and Helps Solve Physiological Mystery Too", Stanford Report, Aug. 29, 2012, 3 pages, retrieved from the Internet: http://news.stanford.edu/news/2012/august/cooling-glove-research-082912.html, retrieved on Dec. 19, 2014.

Matheson, Rob, "Cool Invention Wins First Place at MADMEC", MIT News Office, Oct. 17, 2013, 3 pages, retrieved from the Internet: http://newsoffice.mit.edu/2013/madmec-design-competition-1017, retrieved on Dec. 19, 2014.

Vanhemert, Kyle, "MIT Wristband Could Make AC Obsolete", Wired.com, Oct. 30, 2013, retrieved from the Internet: http://www.wired.com/2013/10/an-ingenious-wristband-that-keeps-your-body-at-theperfect-temperature-no-ac-required/, retrieved on Dec. 19, 2014.

Francioso, L., "Flexible thermoelectric generator for ambient assisted living wearable biometric sensors", Journal of Power Sources, vol. 196, Issue 6, Mar. 15, 2011, pp. 3239-3243.

http://www.stacoolvest.com/, retrieved on Dec. 19, 2014.

http://www.steelevest.com/, retrieved on Dec. 19, 2014.

http://www.veskimo.com/, retrieved on Dec. 19, 2014.

http://www.glaciertek.com/, retrieved on Dec. 19, 2014.

http://www.cvs.com/shop/product-detail/CVS-Cold-Pain-Relief-Pack-Reusable?skuld=324111, retrieved on Dec. 19, 2014.

Chen, A.,"Dispenser-printed planar thick-film thermoelectric energy generators," J. Micromech. Microeng., 21(10), 2011.

Hewitt, A.B., "Multilayered Carbon Nanotube/Polymer Composite Based Thermoelectric Fabrics," Nano Letters, 12 (3), pp. 1307-1310, 2012.

Arens, E., "Partial- and whole-body thermal sensation and comfort— Part I: Uniform environmental conditions," Journal of Thermal Biology, vol. 31, Issues 1-2, Jan. 2006, pp. 53-59.

Arens, E., "Partial- and whole-body thermal sensation and comfort— Part II: Non-uniform environmental conditions," Journal of Thermal Biology, vol. 31, Issues 1-2, Jan. 2006, pp. 60-66.

Bullis, Kevin, "Expandable Silicon", MIT Technology Review, Dec. 14, 2007, URL: http://www.technologyreview.com/news/409198/expandable-silicon/, retrieved from the Internet on Dec. 23, 2014.

"Ortho-Planar Spring", BYI Mechanical Engineering Website, URL: http://compliantmechanisms.byu.edu/content/ortho-planar-spring, retrieved from the Internet on Dec. 23, 2014.

S.-J. Kim, J.-H. Wea and B.-J. Cho: "A wearable thermoelectric generator fabricated on a glass fabric," Energy Environmental Science, 2014.

(56) References Cited

OTHER PUBLICATIONS

L. Francioso, C. De Pascali, A. Taurino, P. Siciliano, A. De Risi: "Wearable and flexible thermoelectric generator with enhanced package," In Proc. SPIE 8763, Smart Sensors, Actuators, and MEMS VI, 876306, May 2013.

C. Huizenga, H. Zhang, E. Arens, D. Wang: "Skin and core temperature response to partial-and whole-body heating and cooling," Journal of Thermal Biology, vol. 29, Issues 7-8, Oct.-Dec. 2004, pp. 549-558.

Bhat, Pradeep P., "Formation of beads-on-a-string structures during break-up of viscoelastic filaments," Aug. 2010, vol. 6:625-631, Nature Physics, 7 pages.

Le, Hue P., "Progress and Trends in Ink-jet Printing Technology," Jan./Feb. 1998, vol. 42:49-62, Journal of Imaging Science and Technology, 16 pages, found at: http://www.imaging.org/ist/resources/tutorials/inkjet.cfm.

Oliveira, Monica S., "Iterated Stretching, Extensional Rheology and Formation of Beads-on-a-String Structures in Polymer Solutions," Jan. 20, 2006, Special Issue of JNNFM on Extensional Flow, MIT, Cambridge, MA, 36 pages.

Owen, M., "Misting of non-Newtonian Liquids in Forward Roll Coating," Jul. 13, 2011, Journal of Non-Newtonian Fluid Mechanics, vol. 166:1123-1128, 6 pages.

Shi, X.D., "A Cascade of Structure in a Drop Falling from a Faucet," Jul. 8, 2004, vol. 265:219-222, Science, 4 pages.

Chapter 15, "Ink Jet Printing", 14 pages, found at http://www.lintech.org/comp-per/15INK.pdf.

Marple, A. and Liu, Y.H.: "Characteristics of Laminar Jet Impactors", Environmental Science & Technology, vol. 8, No. 7, Jul. 1974, pp. 648-654.

Bailey, Adrian G.: "The Science and technology of electrostatic powder spraying, transport and coating", Journal of Electrostatics, vol. 45, 1998, pp. 85-120.

Domnick, et al.: "The Simulation of Electrostatic Spray Painting Process with High-Speed Rotary Bell Atomizers. Part II: External Charging", Part. Part. Syst. Charact. vol. 23, 2006, pp. 408-416, URL: http://www.ppsc-journal.com.

Kelly, Ryan T, et al..: "The ion funnel: theory, implementations, and applications", Mass Spectrometry Reviews,vol. 29, 2010, pp. 294-312.

Crowe, Clayton et al.: "Multiphase Flows With Droplets and Particles", CRC Press, LLC, 1998.

Non-Final Office Action for U.S. Appl. No. 14/066,435, dated Jan. 21, 2016, 29 pages.

Barry et al., "Printing nanopartical building blocks from gas phase using nanoxerography," Applied Physics Letters, 83(26), Dec. 29, 2003, 5527-.

Joo et al., "Ultrafast patterning of nanoparticles by electrostatic lithography," J. Vac. Sci. Technol. B 24(6) Nov./Dec. 2006, 3205-3208.

Kang et al., Assembly of charged aerosols on non-conducting substrates via ion-assisted aerosol lithography (IAAL), Particuology, 33 (2017) 17-23.

Lee et al., "Three-Dimensional Assembly of Nanoparticles from Charged Aerosols," Nano Letters 11 (2011) 119-124.

Lenggoro, et al., "Nanoparticle assembly on patterned "plus/minus" surfaces from electrospray of colloidal dispersion," J. of Colloid and Interface Science 303 (2006) 124-130.

Lim et al., "Nanoxerography utilizing bipolar charge patterns," Applied Physics Letters 101 (2012) 203106(1-5).

N. N.: "Filament Extension Atomizer, Next Generation Spray Technology for Difficult Spray Materials," Sep. 8, 2016, found at https://www.parc.com/content/attachments/FEA-Spray_fact_sheet_20160808.pdf.

Bingheng et al., "Development Trends in Additive Manufacturing and 3D Printing," Engineering 2015, 2015(1)(1); 85-89.

\* cited by examiner

```
                                                    ┌─────────────────────┐
                                                    │     UNIFORMLY       │
                                            110 ---→│  CHARGE SUBSTRATE   │
                                                    │    LAYER SURFACE    │
                                                    └──────────┬──────────┘
┌─────────────────────┐                                         ▼
│  GENERATE AEROSOL   │                             ┌─────────────────────┐
│   USING FILAMENT    │─ 102                        │  SELECTIVELY ALTER  │
│ EXTENSION APPARATUS │                    112 ────→│   SUBSTRATE LAYER   │
└──────────┬──────────┘                             │  SURFACE CHARGING   │
           ▼                                        └──────────┬──────────┘
┌─────────────────────┐                                        │
│SELECT AEROSOL DROPLETS│ -- 104                               │
│    BASED ON SIZE    │                                        │
└──────────┬──────────┘                                        │
           ▼                                                   │
┌─────────────────────┐                                        │
│   CHARGE AEROSOL    │─ 106                                   │
│  TO A FIRST POLARITY│                                        │
└──────────┬──────────┘                                        │
           │                                                   │
           └───────────────────────┬───────────────────────────┘
                                   ▼
                    ┌─────────────────────────────┐
                    │    DEPOSIT CHARGED AEROSOL  │
                    │        ONTO SELECTIVELY     │─ 108
                    │ CHARGE ALTERED SUBSTRATE    │
                    │        LAYER SURFACE        │
                    └─────────────────────────────┘
```

FIG. 1

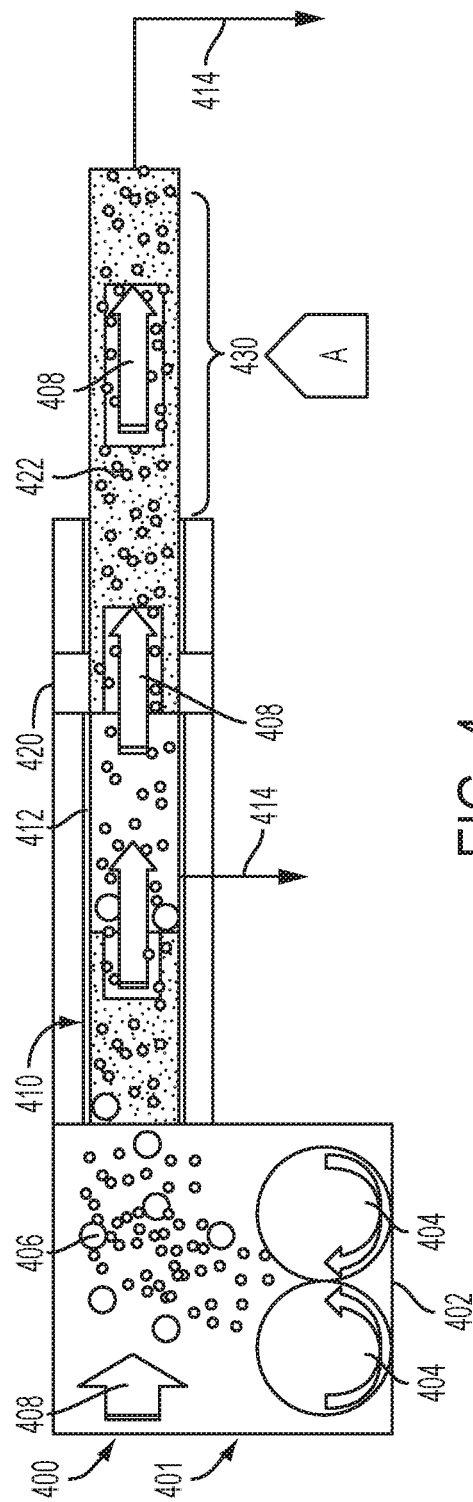
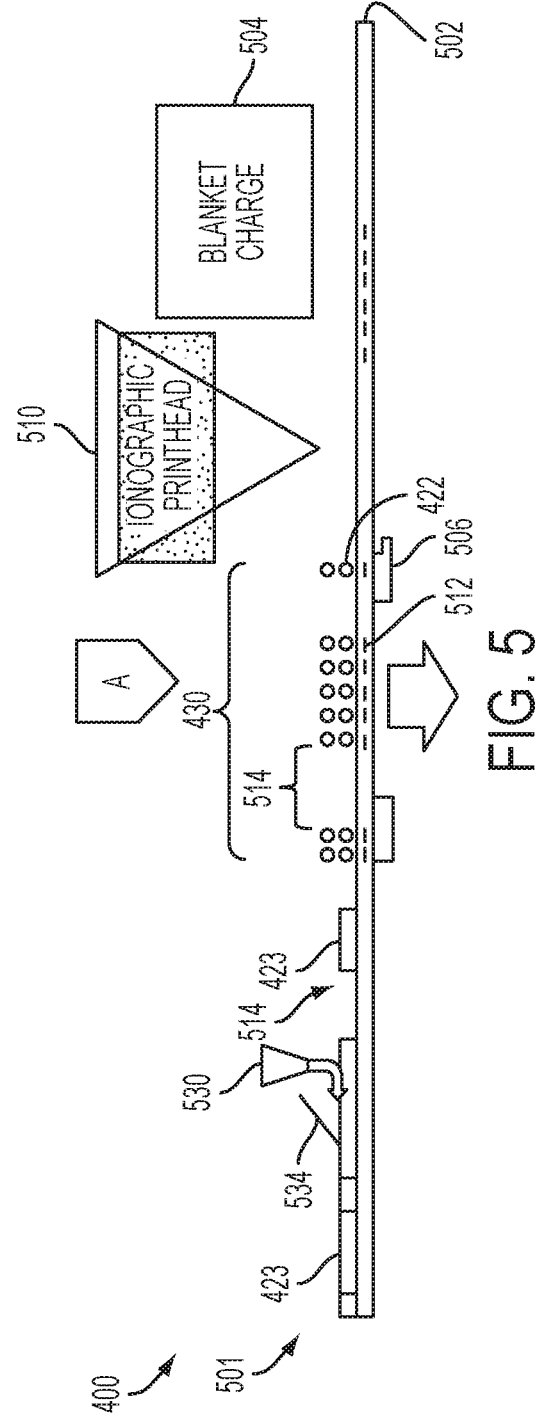
FIG. 4
FIG. 5

ADDITIVE DEPOSITION SYSTEM AND METHOD

BACKGROUND

Custom manufacturing of parts is a growing industry and has wide ranging applications. Traditionally, injection molding machines and other machining techniques were used to create models of objects or to create the objects themselves. More specifically, heated materials like glass, metals, thermoplastics, and other polymers are injected into an injection mold specifically formed in the shape of the desired object. The material is allowed to cool in the mold and take on the shape of the mold to form the object. Injection molds are expensive and time-consuming to create and changes to the shape of the object are difficult to accommodate without further increasing the time and expense of creating the object.

The additive manufacturing industry arose in response to the expense, time, and difficulty in changing injection molds to create models or objects themselves. Known additive manufacturing techniques include fused deposition modeling (FDM), stereolithography (SLA), selective laser sintering (SLS), and jetting systems among others. Each known additive manufacturing technique has limitations in materials, expense, and/or volume capabilities that prevent the production of small run, customized manufacturing and prototyping using a complete set of thermoplastic materials. Further, known additive manufacturing techniques are unable to accurately create a part with mechanical properties, surface finish, and feature replication of the quality object produced by traditional techniques like injection molding.

In situations in which additive manufacturing does not produce parts of sufficient performance for an application, an entire industry of rapid computer numerical control (CNC) machining and rapid injection molding using low cost tools has arisen. However, these techniques are significantly more expensive than additive manufacturing techniques and have their own process limitations.

The industry was forced to decide between a high quality, high volume capability object produced by the traditional, but expensive, inflexible, and time-consuming techniques like injection molding, and additive manufacturing techniques that produced a lower quality object, perhaps without the desired structural integrity, and sometimes without the desired materials, but with greater speed and flexibility. For example, FDM and SLS are limited in the type of material able to be used and create a less than 100% density object. Rapid CNC molding has better quality objects with great feature detail and finishes, but remains expensive. Prototypes created with the known additive manufacturing techniques are often refined until a final design is selected at which point an injection mold is created for large scale, high quality injection molding production. Such a multi-phase production process is also time-consuming and expensive.

The manufacturing industry would benefit from a manufacturing process that realizes the advantages of digital, additive manufacturing with a broad set of thermoplastic materials and feature resolution to be capable of manufacturing objects with the complexity and structural integrity obtained using more traditional manufacturing techniques.

SUMMARY

According to aspects illustrated herein, there is provided a system and method of additive deposition that is capable of using a variety of additive materials and depositing them in a high resolution manner across a substrate. The system is further capable of creating a matrix of additive material by repeated additive material processes.

BRIEF DESCRIPTION OF DRAWINGS

FIG. 1 is an example additive deposition process according to an embodiment of the invention.

FIG. 4 is an example additive material preparation portion of an example additive deposition system according to an embodiment of the invention.

FIG. 5 is an example substrate portion of an example additive deposition system according to an embodiment of the invention.

DETAILED DESCRIPTION

Figure 2:
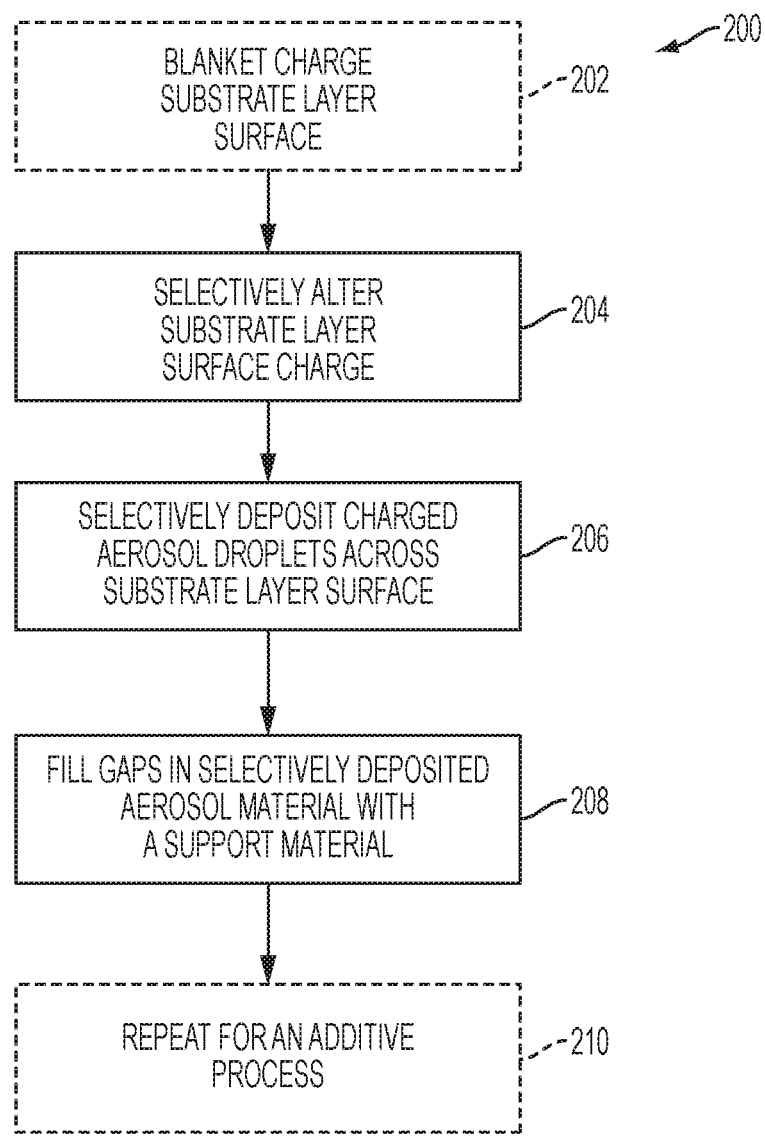
FIG. 2 is a further example additive deposition process according to an embodiment of the invention.

FIG. 1 is an example additive deposition process 100 according to an embodiment of the invention. The process selectively deposits aerosolized, liquid additive material onto a substrate using a charge potential difference between the aerosol droplets and selected portions of the substrate layer surface. The additive material can be a liquid or a liquid form of a material, such as a sold material melted into a liquid state. The additive material can be any number of materials, including polymers such as a thermoplastic. The material is first made into an aerosol that can be formed in the selective deposition process. The selective deposition of additive material onto the substrate layer surface results in a highly efficient process as any excess deposition of additive material is substantially limited as undeposited additive material can be recirculated and recycled back into the process 100. Moreover, by selecting a surface charge density and controlling the charge on droplets one can control the amount of material that is deposited in each iteration. Additionally, the process 100 has a resolution, or fineness, associated with the deposition based on the resolution of the selectively removed charges. This allows the additive process 100 to achieve high resolution levels based on the charge density and the resolution of a charge altering portion of the process. Repeated depositions of additive materials can be used to create a three-dimensional matrix or object constructed of additive material.

A liquid aerosol of additive material can be generated in various ways. As an example, in FIG. 1 the aerosol is generated 102 using a filament extension atomizer. The filament extension atomizer uses a pair of counter-rotating rollers to stretch filaments of liquid fluidized additive material between diverging surfaces of the rollers on a downstream side to generate the aerosol. In an example embodiment, the additive material can be a thermoplastic polymer that is made liquid by heating and melting the polymer. The liquid additive material pools on an upstream side of a nip, the space between the pair of rollers, and is drawn into the nip as the rollers counter-rotate. On a downstream side, the fluid is stretched into a filament between diverging surfaces of the rollers, to which a portion of the fluid still adheres. As the fluid filament is stretched, the filament grows longer and thinner. When the fluid filament reaches a point of instability, the capillary break-up point of the fluid filament, the filament breaks into multiple drops. As the rollers counter-rotate, continuous formation and break-up of fluid filaments across the surface of the rollers generates the aerosol of additive material droplets. The aerosol of additive material is then directed to further portions of the process for deposition onto the substrate. Other filament extension atomizers can be used including diverging piston, co-rotating rollers, and roller and belt configurations.

Optionally, the formed plurality of droplets can be selectively filtered 104 based on size or other physical parameters of the droplets. Selectable physical parameters of the plurality of droplets can include droplet size and/or weight. A screen filter can be used to select the droplets matching the desired physical parameters. Alternatively, an inertial impactor or other devices or methods can be used to select droplets matching desired physical parameters.

The aerosol of additive material droplets is electrostatically charged 106 to a first polarity in preparation for deposition onto a substrate layer surface. An aerosol charger can be used to charge the aerosol droplets as they are transported through or by the charger. In an example, the aerosol can be charged electrostatically by passing the aerosol through a region in which a corona is contained, an ion current is flowing, or using ionizing radiation which excites electron emission from the droplets, or by other means.

The substrate layer surface can also undergo a uniform charging process 110 before selectively altering the charge of the substrate layer surface 112. The substrate charging process 110 uniformly electrostatically charges the surface of the substrate layer. That is, the surface of the substrate layer is uniformly charged to a desired charge density with a polarity that can be opposite or the same as that of the charged aerosol. A substrate charging apparatus can be used to electrostatically charge the substrate layer surface. Such an apparatus can include a corotron, a scorotron or other coronal discharge device. A coronal discharge device generates a discharge of ions, which uniformly electrostatically charge the substrate layer surface.

In an example in which the substrate is electrostatically charged to a polarity opposite that of the aerosol of additive material, a portion of the surface charge on the substrate can be selectively altered to a substantially neutral state. The selective altering of the substrate layer surface charge creates substantially neutral portions of the substrate layer surface to which the charged aerosol is not attracted, or deposited by an electrostatic force. That is, the charged aerosol is selectively deposited by electrostatic force only on those portions of the substrate that remain charged. As the aerosol of additive material and the substrate have opposite polarities, there exists an electric potential between the two. The electrostatic potential causes and electrostatic force that attracts, or deposits, the charged aerosol onto the oppositely charged portions of the substrate layer surface. Charged aerosol is continually attracted, or deposited, onto the substrate layer surface until the electrostatic potential between the charged aerosol and charged substrate layer surface is decreased to a critical point. Once the electrostatic potential between the charged aerosol and the substrate surface layer is weakened to a critical point, the electrostatic force is weakened so that substantially no additional charged aerosol is attracted onto the charged substrate surface layer.

The magnitude of the electrostatic potential, and the strength of the electrostatic force, between the charged aerosol and charged substrate surface layer is based on the charge density and the distance separating the charged aerosol from the charged substrate surface layer. Altering the charge density of the substrate surface layer alters the amount of deposited additive material onto the substrate layer surface. As the charged material is deposited, or attracted, the electrostatic potential between the charged aerosol and the substrate layer surface is reduced as the substrate layer surface charge is neutralized by the deposited charged additive material. Not only can the regions in which the additive material is selectively deposited be limited by selectively altering the electrostatic charge of the substrate layer surface, so can the amount of additive material deposited also be limited similarly. Selectively reducing the electrostatic charge of similarly charged portions or regions of the substrate surface layer causes less similarly charged additive material to be deposited in those portions.

An ionographic print head, or other ion deposition device, can be used to selectively alter the charge of the substrate layer surface 112. The ionographic print head emits ions directed towards the substrate layer surface. The emitted ions contact the substrate layer surface and can neutralize or induce an electrostatic charge on the substrate layer surface, depending on the polarity of the discharged ions and the polarity, or electrostatic state, of the substrate layer surface.

In an example, the substrate can be uniformly charged to a second polarity and the discharged ions can have an opposite polarity to that of the substrate layer surface. When oppositely charged ions contact the substrate layer surface, they neutralize the electrostatic charge of the substrate layer surface at the location of contact. Translating the ionographic print head relative to the substrate and modulating the output of ions, based on an input, results in a substrate surface having regions which retain the original uniform charge and other regions that are electrostatically neutral or charged to an opposite polarity, the polarity of the discharged ions. The charged areas are selectively altered since the charges of the uniformly charged substrate surface layer were selectively substantially neutralized, or selectively altered to an opposite polarity. Charged additive material is deposited, or attracted, onto the charged portions of the substrate surface layer by the electrostatic potential between the substrate surface layer having a second polarity and the charged aerosol having a first polarity. The first and second polarity can be the same, in which case the uniformly charged substrate layer surface will repel the charged aerosol, inhibiting deposition. Or, the first and second polarities can be opposite, in which case the uniformly charged substrate layer surface will attract the charged aerosol, resulting in additive material being deposited onto the substrate layer surface. The ionographic print head is essentially creating the negative space, the area in which the additive material will not be selectively deposited, or the positive space, the area in which the additive material will be selectively deposited based on the first polarity of the charged aerosol and the second polarity of the uniformly charged substrate. The ionographic print head selectively traces an inputted pattern that can be negative or positive. Alternative methods and devices can be used to selectively remove the charges from portions of the uniformly charged substrate to facilitate the selective deposition of additive material across the substrate.

In another example, the substrate layer surface can be substantially neutral and the substrate charging apparatus can selectively alter, or charge, the substrate surface layer in desired area(s). A substrate charging apparatus can apply charge to targeted areas of the substrate according to a predetermined pattern or input. The targeted areas of the substrate that are charged correspond to the areas to which the oppositely charged additive material is attracted. In this example, the desired pattern is formed on the substrate as a positive image, that is, the formed charged areas of the substrate form the desired pattern or arrangement based on the input.

In the example in which the aerosol and the substrate surface share the same polarity, the charged aerosol will be repelled by the like electrostatic charges and the additive material will deposit onto regions of the substrate surface in which the electrostatic charge has been selectively altered to an opposite polarity or substantially neutral state. In an alternative embodiment in which the aerosol and the substrate surface have opposite polarities, the charged aerosol will be attracted and deposited onto the surface due to an electrostatic force caused by the electrostatic potential between the charged aerosol and the oppositely charged substrate surface. Selectively altering the charge of the substrate surface to a polarity that is the same as the aerosol will result in the charged aerosol being repelled and inhibited from depositing into these charge altered areas.

In an example in which the uniformly charged substrate surface has a second polarity opposite the first polarity of the charged aerosol, the substrate layer surface charge can be selectively altered to a neutral, or substantially neutral, state. In this example, the charged aerosol will be attracted and deposited onto the non-altered charged areas of the substrate surface, due to the electrostatic force, but will not be attracted to the substantially neutral portions of the substrate surface. Charged aerosol may deposit in the substantially neutral portions, but the deposition will be minimal as the charged aerosol will be strongly attracted to the non-altered, oppositely charged regions. Further minimization of mis-deposition of the charged material can be done by including a guiding passage for the aerosol, as described below, which prevents deposition of charged aerosol onto the substrate by restricting the deposited additive material to that which is deposited by the electrostatic force attracting the charged aerosol onto the substrate.

The charged aerosol is composed of additive material that is then deposited across the substrate in a desired pattern or arrangement according to the arrangement of the charge altered portions of the substrate. The altered charged portions of substrate surface layer drive the deposition and configuration of the charged additive material to form a desired shape, contour, or pattern. This process of depositing layers of charged additive material can be repeated to form a multi-layer, three-dimensional object of additive material.

FIG. 2 is a further example additive deposition process 200 according to an embodiment of the invention. In this embodiment, the charged aerosol of additive material is deposited onto the substrate layer surface in a similar manner as the previous embodiment of FIG. 1 with the addition of support material that is deposited 208 in gaps or regions between and around the deposited additive material.

In processes in which multiple layers of additive material are to be deposited it can be desirable to ensure that the next layer can be built on a substantially planar surface in order to facilitate more even electrostatic charging. Depositing support material around the additive material provides this and the support for future layers as they are formed. Preferably, the support material does not interact with additive material and the two materials are easily separated once the additive deposition process is complete and the desired object, or matrix, formed of additive material is complete. Each resultant layer of additive and support material forms the substrate layer for the next additive process. The new substrate layer surface is processed as outlined herein to form the next layer of additive and support material, with the process repeating until the object is formed.

The support material can be a number of materials, including fluids and solids, which are selected based on their characteristics and interactions with the additive material. The support material is deposited around the selectively deposited additive material and may be leveled to form a new substrate layer on which the next additive deposition process will occur.

In an example, the support material can be a fluid that is dispensed across the selectively deposited additive material and the substrate layer surface. Preferably the fluid does not bond or is easily separable from the selectively deposited additive material. As a support material, the fluid can harden to solid or semi-solid state to support the selectively deposited additive material. The fluid can be evenly spread and leveled about the additive material using a doctor blade set at a fixed or variable height from the substrate layer surface. Additionally, during the support material process, the doctor blade can be used to remove excess, or built-up, additive material, ensuring an even and level layer for the next additive deposition process.

Alternatively, a slot die coating method and device can be used, as can an inkjet process that dispenses the support material in between the regions of the selectively deposited additive material. Additional alternative methods and devices can be used to add support material in the regions between the selectively deposited additive materials.

In the process 200 of FIG. 2, initially, at least a portion of the substrate surface layer can be uniformly charged 202. As discussed above, this can be done by a blanket charging apparatus, such as a scorotron, that evenly charges the substrate surface layer to a second polarity opposite that of the first polarity of the additive material aerosol.

A portion of the substrate surface layer charge is selectively altered 204 in a selected pattern or arrangement. In the embodiment shown, the selectively charge altered portions become substantially neutral or oppositely charged, i.e. altered from the second polarity to the first polarity. The charge unaltered portions of the substrate surface layer are the portions to which the charged aerosol of additive material will be electrostatically attracted and deposited onto by an electrostatic force. The charge altered regions, or substantially neutral regions, will not have additive material deposited thereon as the charged aerosol will be repelled from depositing and/or the electrostatic force will be weak enough to not attract charged aerosol droplets onto the substrate surface layer for deposition.

Alternatively, rather than selective removal of charges from the substrate surface layer a substantially neutral substrate surface layer can be selectively electrostatically altered to a polarity opposite the first polarity of the electrostatically charged aerosol of additive material. The charged aerosol is then selectively deposited on the portions of the substrate surface layer that have been selectively electrostatically altered and are not attracted to the neutral portions of the substrate surface layer where no electrostatic charge has been applied.

A portion of the charged aerosol of additive material is then deposited 206 on the charged portions of the substrate surface layer formed by selectively altering the electrostatic charge(s) of the said layer. The substrate surface layer now has a selectively deposited layer of additive material deposited onto it. Gaps are formed on the substrate between and around the deposited additive material. The gaps are regions where the electrostatic charge of the substrate surface layer was selectively removed or was never applied, which inhibited the deposition of additive material onto those portions of the substrate. The gaps are voids between the deposited additive material and vary in size, shape, and contour in opposing compliment to the deposited additive material. The gaps are then filled 208 with a support material, as described above.

The support material can be a number of different materials, including a liquid or a solid that is dispensed and leveled around and between the deposited additive material as described above. The support material surrounds and supports the selectively deposited additive material structure as it is formed in a layer-by-layer process.

In an example, the support material can be a thermoset material. The thermoset material is a malleable prepolymer that can be pressed into the gaps between the deposited additive materials using the doctor blade. Once deposited in the gaps, the thermoset support material is cured, or heated, to polymerize and set the material into a solid, hard material that surrounds and supports the selectively deposited additive material.

As mentioned above, this process 200 can be repeated 210 to create a multi-layer, three-dimensional structure that is formed in a layer-by-layer process using a substrate charge deposition and selective charge removal and/or selective charge application process.

The various steps of the processes outlined in the embodiments of FIGS. 1 and 2 can be done in a step-by-step process or a continuous process. That is, each portion of the process can be completed across at least a portion of the substrate before moving onto the next portion of the process, or the various steps of the processes can occur simultaneously in the orders outlined as the substrate is translated through the various portions of the system. FIG. 5, discussed in more detail below, shows an additive deposition process in which the latter occurs, whereby the various process steps are done concurrently as the substrate is translated through the various portions.

Figure 3:
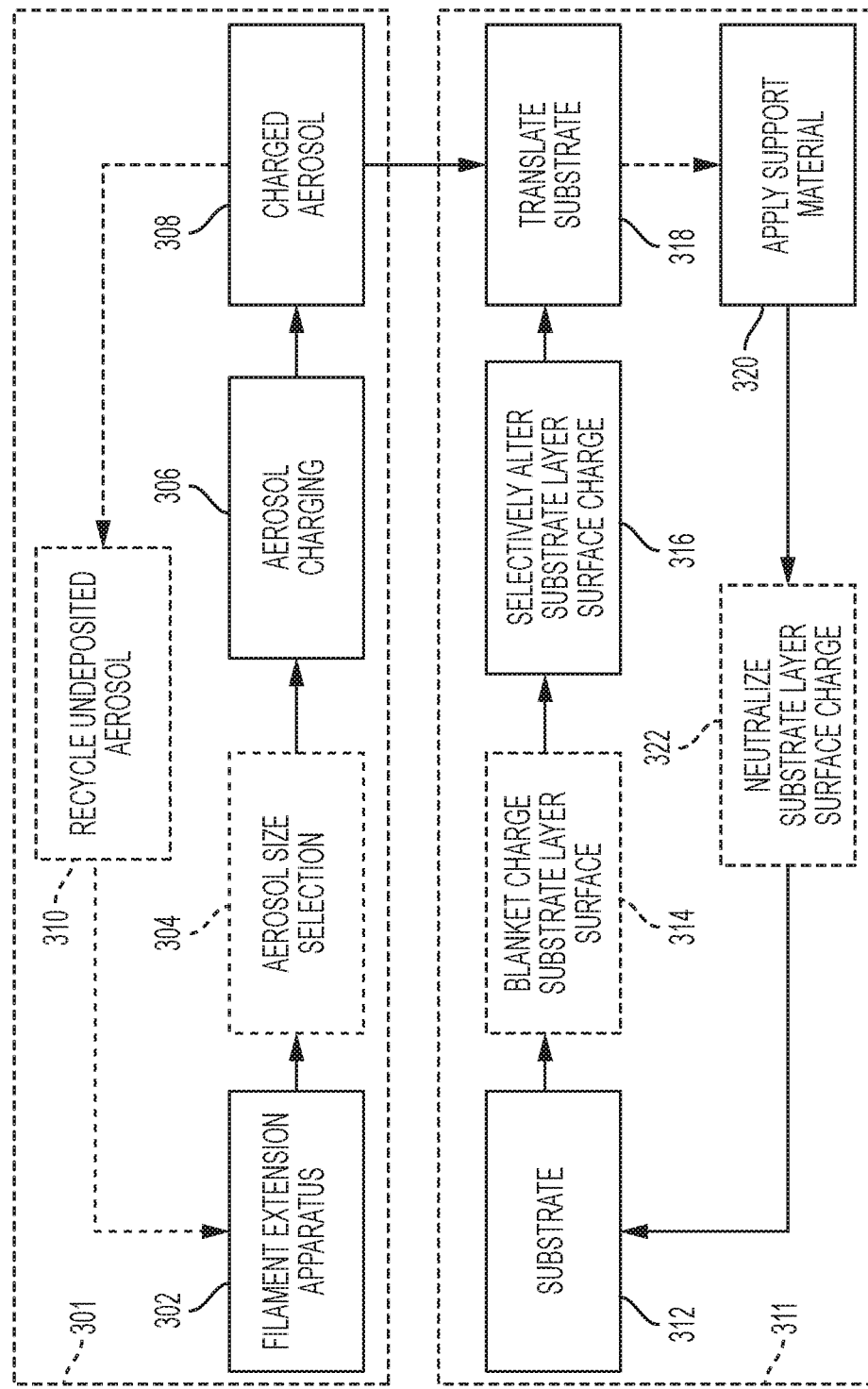
FIG. 3 is a block diagram of an example additive deposition system according to an embodiment of the invention.

Referring now to the block diagram shown in FIG. 3, an example additive deposition system 300 is shown that includes an additive material handling portion 301 and a substrate handling portion 311 that intersect when the charged aerosol of additive material 308 is deposited onto the substrate 318. The material handling portion 301 includes a passage of channel(s) through which the charged additive material is directed over the selectively charged translating substrate. An opening in the passage or channel allows the charged additive material to be pulled through by an electrostatic force and deposited onto areas of the substrate surface layer due to the electrostatic potential between the charged aerosol and selected regions of the substrate surface layer. Un-deposited material, charged additive material that was not attracted to selected portions of the substrate surface layer, can be re-circulated or recycled back into the additive material handling portion 301.

A filament extension atomizer 302 is included in the additive material handling portion 301 of the system 300. The filament extension atomizer 302 is used to generate the aerosol of additive material to be deposited onto the substrate surface layer 312. The filament extension atomizer 302 uses a pair of counter-rotating rollers to stretch fluid filaments of additive materials between diverging surfaces of the rollers on a downstream side. The filaments are stretched to a capillary break-up point, at which point a portion of each of the fluid filaments breaks down into as an aerosol of additive material droplets.

Use of a filament extension atomizer allows for the atomization of fluids and materials that exhibit non-Newtonian properties. Non-Newtonian fluids can be difficult to atomize due to extensional thickening that occurs in stretched filaments of the fluid, which requires the filaments to be stretched beyond the ability of conventional spray generators, to generate the aerosol of atomized fluid material. In addition to non-Newtonian fluids, the fluid extension atomizer can also be used with a Newtonian fluid to create an aerosol.

The aerosol can then be filtered based on size or other physical parameters of the droplets by an aerosol size selection apparatus or method 304. Size, or other physical parameter, selection 304 of the generated aerosol can be done by a filter, inertial impactor or other device or method capable of excluding droplets having physical parameters outside of predetermined limits. The inertial impactor is placed in the stream of aerosol droplets and includes geometry, such as sharp corners, that requires the droplets to flow around to continue downstream. Droplets having a momentum that exceeds a threshold set by the geometry of the impactor are excluded from the stream, instead impacting the geometry of the impactor rather than flowing around. Momentum of a droplet is a function of speed and mass of the droplet, allowing the impactor to exclude droplets that are outside of predetermined size and weight parameters.

The aerosol is charged 306 in preparation for deposition on the substrate 312. The aerosol is charged 306 by an aerosol charging apparatus. The aerosol charging apparatus can generate a region in which a corona is contained, an ion current is flowing, or ionizing radiation which excites electron emission from the droplets, charging the droplets of the aerosol to a desired first polarity. The charge of the aerosol can be opposite in polarity to the blanket charge of the substrate surface layer 312, which causes the charged aerosol to be attracted to the oppositely charged portions of the substrate surface layer.

Once charged, the aerosol 308 is guided, or passed, parallel over the surface of the selectively charged substrate surface layer 318 to deposit the additive material. The oppositely charged aerosol and portions of the substrate surface layer are attracted to one another due to an electrostatic potential. The electrostatic potential creates an electrostatic force which drives the aerosol to deposit onto the selected regions of the substrate surface layer. The charged aerosol of additive material can be guided through a passage or channel by an airstream or other method. An opening on the passage or channel allows charged aerosol droplets to electrostatically interact with the selected portions of the substrate surface layer only over a defined region, creating the electrostatic potential and resultant electrostatic force between the two. The electrostatic force causes a portion of the charged aerosol of additive material to exit the passage or channel through the opening and selectively deposit onto the substrate surface layer.

Un-deposited charged aerosol can be optionally recycled 310 back into the filament extension atomizer 302 for use in later additive deposition processes. In this manner, substantially only the additive material deposited onto the substrate is used, which results in a high efficiency additive process. The excess, un-deposited additive material is redirected back through the additive material handling portion 301 to the filament extension atomizer. The fluid additive material can then undergo further aerosol generation processes.

The substrate handling portion 311 of the additive deposition system 300 can uniformly charge and selectively alter electrostatic charges of the substrate surface layer 312 to facilitate the selective deposition of additive material. The substrate surface layer 312 can be initially blanketed with a uniform charge 314 of a similar or opposite polarity to that of the first polarity of the charged aerosol 308. A blanket charging apparatus is used charge the substrate surface layer 312.

Once blanketed in charge, at least a portion of the charge is selectively altered 316. An ionographic print head or other suitable device or apparatus can be used to selectively alter the electrostatic charge of the substrate surface layer. Selectively altering the charge of the substrate surface layer creates areas of the surface that are charge neutral, similarly charged to the first polarity or oppositely charged to the first polarity. The neutral, or similarly charged portions of the substrate surface layer do not attract the charged aerosol, inhibiting or preventing the deposition of additive material in these locations.

After a portion of the substrate surface layer electrostatic charge has been selectively altered, the substrate is translated 318 past the charged aerosol guiding structure. The charged aerosol droplets are selectively deposited onto the substrate surface layer by an electrostatic force caused by the electrostatic potential between the charged aerosol and selected regions of the substrate surface layer. Once deposited, the additive material is allowed to cool and solidify.

The substrate can also undergo further additive deposition step(s). Support material can be applied 320 between the deposited additive materials to create a new, level substrate layer surface. As discussed above, the support material can be dispensed across the current substrate surface layer and leveled about the selectively deposited additive material to form a new substrate layer surface for the next additive deposition process. The result is a smooth, continuous layer of additive material and support material forming a substrate layer surface, the entire structure of additive material and additive material supported by the original substrate.

If repeated additive deposition processes are to be carried out, the previous layer of selectively deposited additive material can be kept in a semi-fluid state to assist with adhering and bonding the next additive material layer to form the multi-layer structure. As one example, the whole process can be completed in a heated environment, so that each successive selective deposition of additive material bonds to the previously deposited material.

Any residual charges of the deposited additive material and/or substrate surface layer can be neutralized 322 concurrently during the scorotron pre-charge step. Alternatively, the neutralization of any residual charges can be done as a separate step before the scorotron pre-charge step. The surface now once more travels through the substrate handling portion 311 of the additive deposition system 300. This process can be repeated as many times as necessary to create a structure or matrix of selectively applied additive material. To create the layers, the substrate translation 318 can include moving the substrate in a vertical axis, thereby maintaining a constant and fixed separation between the charged aerosol deposition and the substrate layer surface. Alternatively, the charged aerosol deposition can be translated vertically to maintain the same separation. Once the desired structure or matrix is completed, the support material can be separated from the additive material if necessary or desired using a number of different processes including removal by solvent, mechanical removal or thermal removal.

FIG. 4 is an example additive material preparation portion 401 of an additive deposition system 400 according to an embodiment of the invention. In the preparation portion 401 of the system 400, an aerosol 406 of additive material is formed using a filament extension atomizer 402. The additive material aerosol is charged 422 in preparation for deposition through an opening 430 onto a substrate. Additive material, in a fluid form, is introduced, either externally or internally, to the filament extension atomizer 402. A pair of counter-rotating rollers 404 engage the fluid additive material, and stretch filaments of additive material between the diverging downstream surfaces of the rollers 404. As the fluid filaments are stretched between the rollers 404, the fluid filament reaches a point of instability, a capillary break-up point. At the capillary break-up point, at least a portion of each of the fluid filaments breaks down into an aerosol of additive fluid droplets 406. An introduced airstream 408 can be used to guide the formed aerosol through the additive material preparation portion 401 of the system 400. The air stream 408 can be created by the rotation of the rollers 404 of the filament extension atomizer 402 or by other means, such as an external source.

Having the filament extension atomizer 402 in a vertical orientation, as shown in FIG. 4, the aerosol 406 formed by the filament extension atomizer 402 can be filtered based on droplet size and/or weight. The force of gravity on the droplets of the formed aerosol 406 can be used to prevent oversized and/or overweight droplets from proceeding further through the portion 401. Varying the vertical height of the filament extension atomizer 402 with respect to the airstream 408 can be used to selectively allow droplets of a desired size and/or weight to exit the filament extension atomizer 403 and continue through the portion 401 and into the passage 410.

A passage 410 guides the generated aerosol from the filament extension atomizer 402 through the additive material handling portion 401 of the system 400. The passage 410 is positioned to guide the flow of the generated aerosol parallel and proximate to the translating substrate to facilitate the deposition of charged additive material onto selected portions of the substrate surface layer based on the electrostatic interaction between the charged aerosol and the selectively charge altered substrate surface layer.

A droplet selector 412 can be disposed within a passage 410 of the additive material handling portion 401. The droplet selector 412 can selectively remove, or exclude, droplets that have physical parameters, such as size and weight, outside a set of desired parameters. Excluded droplets can be recycled 414 back into the filament extension atomizer 402 for later use. In the embodiment shown in FIG. 4, the droplet selector 412 is an inertial impactor that is positioned in the stream of flowing formed aerosol. The impactor includes geometry to selectively filter aerosol droplets based on their momentum. Using this geometry, droplets that are outside of a predetermined and/or desired physical parameter range are blocked from continuing through the passage 410.

An aerosol charging apparatus 420 electrostatically charges the aerosol droplets as they pass. The charging apparatus 420 induces an electrostatic charge in the aerosol droplets in preparation for deposition onto a substrate surface layer. The charging apparatus 420 can generate a region in which a corona is contained, an ion current is flowing, or ionizing radiation through which the aerosol droplets are passed. This excites electron emission from the droplets to electrostatically charge them to a desired polarity. Charged aerosol droplets 422 continue through the passage 410 and across a deposition opening 430.

As the charged aerosol 422 passes across the deposition opening 430, a portion of the charged aerosol is attracted and deposited through the opening 430 onto a substrate surface layer passing below due to an electrostatic force caused by the electrostatic potential between the charged aerosol 422 and the substrate surface layer. The excess, or residual, charged aerosol 422 that continues through the passage can be recycled 414 back into the system 400.

FIG. 5 illustrates an example substrate portion 501 of the additive deposition system 400. In this portion, a substrate 502 can be uniformly blanket charged before a portion of the charge of the substrate 502 layer surface is selectively altered. As the substrate 502 passes beneath the deposition passage opening 430, charged aerosol droplets 422 are attracted and deposited onto selected regions of the substrate 502 layer surface due to an electrostatic force caused by the electrostatic potential between the substrate 502 layer surface and charged aerosol 422. The electrostatic force drives a portion of the charged aerosol 422 from the deposition passage opening 430 onto selected regions of the substrate 502 layer surface. Remaining charged aerosol continues through the deposition passage 410 to be recycled or disposed of. The charged aerosol 422 is attracted to the oppositely charged portions of the surface of the substrate. Gaps 514 form between the deposited portions of additive material 423 that are filled with a support material 530 to create a smooth, continuous layer of material, support and additive, that covers the substrate layer surface. The electrostatic charges are then substantially neutralized from the substrate and additive material to create a new electrostatically neutral substrate layer surface that can be fed through the additive deposition system 400 for further additive material deposition processes. The substrate 502 is translated through the system 400 by a substrate translation system 506.

A uniform blanket electrostatic charge can be induced across the substrate 502 layer surface by a blanket charging apparatus 504. In the example embodiment shown in FIG. 5, the substrate is blanketed with a negative charge. In an example embodiment, a scorotron can be used to create the blanket charge across the substrate layer surface. The scorotron electrostatically charges the substrate layer surface by generating a corona discharge and accelerates the charge toward the passing substrate, charging the substrate surface layer until the surface charge density causes the surface potential to be equal to that of the scorotron grid. The corona discharge can be formed by placing a high voltage on a thin wire inside a metal walled cylinder. The high field thus created in turn ionizes the surrounding gas, such as air. As the substrate passes through the formed cloud of charged particles, the substrate layer surface is charged to a polarity of that of the emitted particles. The scorotron allows the substrate layer surface to be charged to uniform charge density regardless of previous charge states, which can eliminate the need to reduce or substantially neutralize residual charges of the new substrate layer surface, of support and additive material, before a further additive deposition process occurs.

Once the substrate 502 layer surface is covered in a continuous and equal electrical charge, a portion of the charge is selectively altered by a selective charging apparatus 510 based on an input. The input can come from a user, computer program or other and contains instructions regarding the pattern of selective charge altering performed by the apparatus 510. In the embodiment shown, the selective charging apparatus 510 is an ionographic print head. The ionographic print head directs (or accelerates using a grid) a stream of ions having a polarity opposite that of the charged substrate. The emitted oppositely charged ions neutralize or oppositely charge a local region of the substrate layer surface. In this manner, the ionographic print head can neutralize, oppositely charge or charge in a selective manner based on an input such as a pattern, computer control instructions or others. The ionographic print head 510 can be moved across the surface of the substrate 502 in a linear manner perpendicular to the translation of the substrate 502, with the substrate 502 advancing a width of the ionographic print head 510 after each pass. The linear motion of the ionographic print head 510, in combination with the translation of the substrate 502, form a 2-dimensional pattern of selectively charged portions across the surface of the substrate 502.

Alternatively, an array of ionographic print heads or other ion deposition device can be arranged. In this manner, the amount of substrate 502 layer surface covered by each pass of the array can be increased. Or, the array can span a distance equal or greater than the width of the substrate 502 which would allow the array to be fixed, with the substrate 502 advancing underneath, either in a continuous or step-wise manner.

After the ionographic print head 510 has selectively altered at least a portion of the electrostatic charges of the substrate 502 surface layer, the substrate 502 is translated below the deposition opening 430 by the substrate translation system 506. As the charged aerosol 422 flows through the passage 412 and across the deposition opening 430, a portion of the charged aerosol 422 is attracted onto the oppositely charged regions 512 of the substrate 502 layer surface. In the example shown, the oppositely charged portions 512 of the substrate 502 layer surface are those portions of the substrate 502 layer surface where the blanket charge has not been selectively removed or oppositely charged.

The portions of the surface of the substrate 502 where the charge was selectively altered to a neutral or oppositely charged state form gaps 514 between the selectively deposited, charged additive material 423. A support material 530 is deposited across the substrate 502 layer surface and deposited additive material 422, filling the gaps 514. A doctor blade 534 is positioned a set distance off the surface of the substrate 502, smoothing and leveling the surface of the selectively deposited additive material 422 and support material 530. Once the substrate 502 layer surface is covered in deposited additive material 423 and support material 530, the remaining, or residual, electrical charges can be substantially reduced or neutralized from the materials 422 and 530 and the substrate 502.

The substrate 502 can undergo repeated additive material deposition processes or the additive material can be allowed to set, if necessary, to the substrate, as discussed above. The support material 530 can be bonded to the substrate 502 as part of the setting process, or can be removed, leaving the set deposited additive material object.

The substrate translation system 506 can translate the substrate horizontally in the plane of the substrate 502 and vertically, perpendicular to the substrate 502. In the embodiment shown, the substrate 502 can be translated by the system 506 along three axes. In examples in which the selective charging apparatus 510 is translated in an axis across the substrate 502 layer surface, the substrate translation system 506 can translate the substrate 502 in an incremental, or step-wise, manner after each pass of the selective charging apparatus 510. Once the substrate 502 layer surface charger altering is complete, the substrate translation can translate the substrate 502 in a vertical axis before repeating the translation in a horizontal plan to create a new layer of selectively deposited additive material. In another example in which the selective charging apparatus 510, or an array of apparatuses 510, is stationary, the substrate 502 can be translated in 2 or more axes to complete the desired charge removal pattern.

The various components of the substrate portion 501 of the additive deposition system 400 can be arranged so that the substrate 502 is translated under the components 504, 510 and 530 in sequence. In this manner, the substrate 502 can be continuously processed through the system 400.

Repeating the additive material deposition process through the system 400 can be used to build up the additive material in a 3-dimensional matrix of material. The repeated additive material deposition processes create a high-resolution 3-dimensional object. The resolution of the additive deposition process can be varied based on the fineness and accuracy of the selective charge removal apparatus 510. The resolution is further enhanced due to the selective thickness of the deposited additive material. A greater electrostatic potential between the charged aerosol 422 and the oppositely charged substrate 502 can result in a larger agglomeration of aerosolized additive material on the substrate 502, as additional charged aerosol can be required to neutralize the oppositely charged region of the substrate layer surface depending on the magnitude of the electrostatic potential. As discussed above, the support material 530 can be removed in a finishing process to expose the solid 3-dimensional object formed of deposited additive material.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An additive deposition system, comprising:
    an aerosol generation apparatus configured to generate an aerosol of additive material;
    an aerosol charging apparatus to electrostatically charge the generated aerosol of additive material to a first polarity;
    a selective charging apparatus to selectively alter an electrostatic charge of portions of a substrate layer surface;
    the charged aerosol of additive material selectively deposited onto the charge altered portions of the substrate by an electrostatic force due to an electrostatic potential between the charged aerosol of additive material and the charge altered portions of the substrate, and
    a support material deposition apparatus to deposit support material around the selectively deposited charged aerosol,
    wherein the system repeatedly generates the aerosol, charges the aerosol, charges the substrate layer surface, deposits the charged aerosol, and deposits the support material to form a three-dimensional object.

2. The additive deposition system of claim 1, wherein the aerosol generation apparatus comprises a pair of counter-rotating rollers that stretch filaments of liquid fluidized additive material between diverging surface of the rollers on a downstream side to generate an aerosol.

3. The additive deposition system of claim 1, wherein the additive material is a polymer.

4. The additive deposition system of claim 1, wherein the selective charging apparatus selectively alters the electrostatic charge of the portions of the substrate layer surface based on an input from one of a user or a computer program.

5. The additive deposition system of claim 1, wherein selectively altering the electrostatic charge of the portions of the substrate layer surface includes altering at least one of a polarity or an electrostatic charge density.

6. The additive deposition system of claim 1, wherein the selective charging apparatus selectively alters the electrostatic charge of the portions of the substrate layer to one of a polarity opposite the first polarity, a polarity similar the first polarity or a substantially neutral state by providing a charge opposite a charge opposite a current charge on the substrate layer.

7. The additive deposition system of claim 1, wherein the selective charging apparatus is one of an ionographic print head or an ion deposition device.

8. The additive deposition system of claim 1, including one or more selective charging apparatuses arranged to span a length of the substrate.

9. The additive deposition system of claim 1, wherein the selective charging apparatus is configured to be translated along at least one axis substantially parallel to the substrate surface layer.

10. The additive deposition system of claim 1, further including a substrate charging apparatus configured to electrostatically charge the substrate layer surface uniformly with an electrostatic charge having a second polarity.

11. The additive deposition system of claim 10, wherein the first polarity and second polarity are substantially the same and the selective charging apparatus selectively alters the electrostatic charge of the portions of the substrate surface layer to at least one of a polarity opposite the first and second polarities and a substantially neutral state by providing a charge opposite a polarity of current charge on the substrate layer.

12. The additive deposition system of claim 10, wherein the first polarity and the second polarity are substantially opposite and the selective charging apparatus selectively alters the electrostatic charge of the substrate surface layer to at least one of a polarity substantially similar the first and a substantially neutral state.

13. The additive deposition system of claim 10, wherein the substrate charging apparatus is one of a corotron, a scorotron or a coronal discharge device.

14. The additive deposition system of claim 1, further including an aerosol deposition passage located proximate to the substrate and configured to guide the charged aerosol parallel to the substrate across an opening disposed on the aerosol deposition passage, at least a portion of the charged aerosol directed nearby the opening and deposited onto the charged portions of the substrate surface layer by the electrostatic force.

15. The additive deposition system of claim 14, further including an air stream configured to carry the generated aerosol of additive material from the aerosol generation apparatus, through the aerosol charging apparatus and the aerosol deposition passage.

16. The additive deposition system of claim 14, further including an aerosol size selector configured to exclude generated aerosol based on a physical parameter including at least one of the aerosol size and weight.

17. The additive deposition system of claim 16, having a recycle path through which the excluded generated aerosol is recycled back into the aerosol generation apparatus.

18. The additive deposition system of claim 1, further including a substrate translation system configured to translate the substrate in at least one of a horizontal plane and a vertical plane.

19. The additive deposition system of claim 18, further including a doctor blade positioned a distance from the substrate layer surface and configured to level the support material deposited about the deposited additive material.

* * * * *